US011662199B2

(12) United States Patent
Fresquet et al.

(10) Patent No.: US 11,662,199 B2
(45) Date of Patent: May 30, 2023

(54) METHOD AND DEVICE FOR MEASURING INTERFACES OF AN OPTICAL ELEMENT (71) Applicant: FOGALE NANOTECH, Nimes (FR)

(72) Inventors: Gilles Fresquet, Garrigues Sainte Eulalie (FR); Sylvain Petitgrand, Caissargues (FR)

(73) Assignee: FOGALE NANOTECH, Nîmes (FR)

( * ) Notice: Subject to any disclaimer, the term of this patent is extended or adjusted under 35 U.S.C. 154(b) by 78 days.

(21) Appl. No.: 17/310,920

(22) PCT Filed: Mar. 2, 2020

(86) PCT No.: PCT/EP2020/055429
§ 371 (c)(1),
(2) Date: Aug. 31, 2021

(87) PCT Pub. No.: WO2020/178234
PCT Pub. Date: Sep. 10, 2020

(65) Prior Publication Data
US 2022/0136822 A1 May 5, 2022

(30) Foreign Application Priority Data
Mar. 5, 2019 (FR) ...................................... 1902234

(51) Int. Cl.
*G01B 11/06* (2006.01)
*G01B 9/0209* (2022.01)
(Continued)

(52) U.S. Cl.
CPC ........ *G01B 11/0675* (2013.01); *G01B 9/0209* (2013.01); *G01B 11/002* (2013.01); *G01B 11/14* (2013.01)

(58) Field of Classification Search
CPC .............. G01B 11/0675; G01B 11/002; G01B 11/14; G01B 11/272; G01B 11/028;
(Continued)

(56) References Cited

U.S. PATENT DOCUMENTS 8,760,666 B2 *  6/2014  Heinisch ............ G01M 11/0221
356/505
9,151,941 B2 * 10/2015 Fresquet .............. G01B 9/0209
(Continued)

OTHER PUBLICATIONS

French Search Report received for Application No. 1902234, dated Jan. 15, 2020.
(Continued)

*Primary Examiner* — Jonathan M Hansen
(74) *Attorney, Agent, or Firm* — Greer, Burns & Crain, Ltd (57) ABSTRACT A method for measuring interfaces of an optical element, forming part of a plurality of similar elements including at least one reference optical element, the method implemented by a device, the method including:
 relative positioning of each reference optical element and the measurement beam, to allow a measurement of interfaces of each reference optical element;
 acquisition of a reference image, of each reference element;
 positioning of the measured optical element to allow acquisition of a measurement image, of the optical element to be measured;
 determining a difference of position in a field of view of the measured element with respect to each reference optical element, based on the reference and measurement images;
 adjusting the position of the measured optical element in the field of view to cancel the difference of position; and (Continued)

measuring the interfaces of the measured optical element by the measurement beam.

15 Claims, 6 Drawing Sheets

(51) Int. Cl.
*G01B 11/00* (2006.01)
*G01B 11/14* (2006.01)

(58) Field of Classification Search
CPC ..... G01B 9/0209; G01B 9/0203; G01M 3/20; G01M 11/02; G02B 21/0016; G02B 27/62
See application file for complete search history.

(56) References Cited

U.S. PATENT DOCUMENTS

| | | |
|---|---|---|
| 9,897,927 B2 | 2/2018 | Fresquet et al. |
| 2011/0075887 A1 | 3/2011 | Tanaka |
| 2016/0187222 A1* | 6/2016 | Oya ................... G01M 11/0221 356/127 |

OTHER PUBLICATIONS

International Search Report and Written Opinion received for PCT/EP/2020/055429, dated Jun. 16, 2020.

* cited by examiner

METHOD AND DEVICE FOR MEASURING INTERFACES OF AN OPTICAL ELEMENT

BACKGROUND

The present invention relates to a method for measuring interfaces of an optical element forming part of a plurality of substantially identical optical elements. The invention also relates to a measurement device implementing such a method.

The field of the invention is non-limitatively that of optical measurements of optical elements.

During the manufacture of optical elements, such as lenses or objectives comprising several lenses, it may be necessary to control or measure thicknesses or positions of constituent elements, or also gaps between constituent elements, along a measurement axis such as the optical axis of the optical element.

To this end, it is known in particular to use low-coherence interferometry techniques. A measurement optical beam originating from a broad-spectrum optical source is propagated through the surfaces of the optical element. The reflections of the beam on these surfaces are collected and analysed, making them interfere with one another and/or with a reference beam in order to determine the differences in the optical paths between interfering beams, and to deduce therefrom the positions and/or distances between corresponding surfaces or interfaces. Thus it is possible, for example, to determine thicknesses of lenses, distances between lenses and/or positions of lenses in an optical assembly.

Such measurement techniques generally function by retro-reflection. It is then necessary for the measurement optical beam to be incident on all the surfaces to be measured with a normal or perpendicular incidence, so as to generate a reflected wave that can be captured by the measurement system. For measuring an optical assembly, this condition generally involves the need to superpose or align the measurement beam with the optical axis of the assembly, and in particular the lenses of which it is composed. It is therefore necessary to implement an effective procedure for alignment of the measurement optical beam. In practice, it is necessary to be able to position the measurement beam with respect to the optical axis of an assembly with accuracy for example of the order of one micron for objects having dimensions of several millimetres. It is then necessary to have available methods making it possible to achieve this performance.

A system for measuring positions of lenses in an optical assembly with a low-coherence interferometer is described in U.S. Pat. No. 8,760,666 B2. The alignment of the measurement beam is carried out by propagating an alignment optical beam through optical elements of the assembly, and by detecting the deflection thereof with respect to a theoretical position with a position-sensitive detector of the CCD or PSD type. As the theoretical position is in practice unknown, and as moreover the alignment beam is degraded by the lenses through which it passes, this deflection is detected by performing a rotation of the optical assembly, so as to deduce therefrom a path travelled by this alignment beam on the detector. The position of the assembly and the angular orientation thereof are corrected so as to minimize the extent of this path.

However, in a context of mass production of optical assemblies, for example for manufacturing objectives for smartphones, measurement times must be minimized. In particular, the use of optical alignment techniques based on an angular rotation of the samples as previously described is unsuitable.

SUMMARY

An aim of the present invention is to overcome these drawbacks.

Another aim of the invention is to propose a method and a device for measuring interfaces, such as measurements of positions or gaps between surfaces, of an object such as an optical element or assembly, which allow a quick and accurate positioning of the measurement beam with respect to the optical axis of the object.

An aim of the invention is also to propose a method and a device for measuring interfaces or surfaces suitable for measurements on assemblies of lenses, in particular having dimensions of the order of several hundreds of micrometres to several millimetres, or of microlenses.

An aim of the invention is also to propose a method and a device for the measurement of interfaces suitable for measurements on aspherical or freeform type lenses having radii of curvature on a millimetric scale.

Yet another aim of the invention is to propose a method and an interface measurement device suitable for measurements at a high rate on a plurality of similar optical objects or elements.

At least one of these aims is achieved with a method for measuring interfaces of an optical element to be measured, forming part of a plurality of similar optical elements comprising at least one optical element called "reference optical element", the method being implemented by a measurement device comprising:
- an imaging channel configured to produce an illumination beam, and comprising imaging means configured to acquire images of an optical element illuminated by said illumination beam in a field of view of the imaging means; and
- a measurement channel configured to produce a measurement beam at a determined position with respect to said field of view, and comprising a distance optical sensor configured to produce distance and/or thickness measurements;

said method comprising the following steps:
- relative positioning of the at least one reference optical element and of the measurement beam, so as to allow a measurement of interfaces of said reference optical element;
- acquiring an image, called "reference image", of the thus-positioned at least one reference optical element;
- positioning of the optical element to be measured with respect to the field of view so as to allow the acquisition of an image, called "measurement image", of said optical element to be measured;
- determining a difference of position in the field of view of the optical element to be measured with respect to the at least one reference optical element, based on the reference and measurement images;
- adjusting the position of the optical element to be measured in the field of view so as to cancel said difference of position; and
- measuring the interfaces of the optical element to be measured by means of the measurement beam.

Within the context of the present invention, an "optical element" can denote any type of optical object, intended for example to be inserted in an optical beam, to shape an optical beam, and/or to produce an image. It may denote for example:
- a single optical component such as a lens or a blade;
- an assembly of lenses and/or other optical components, such as an imaging or camera objective, or a device for shaping an optical beam,
- an optical waveguide, an optical fibre, etc.

An optical element can in particular be constituted by, or comprise, refractive or diffractive elements such as lenses. It can then comprise an optical axis corresponding to the axis of propagation of a beam passing therethrough. This optical axis can also, in particular for optical elements with refractive lenses, be the axis or the only axis perpendicular to all the surfaces or the interfaces of the optical element.

By "plurality of similar optical elements" is meant a set of optical elements of the same type, the same model, from one and the same batch, or having undergone the same manufacturing steps, in particular in mass production.

The method according to the present invention makes it possible to carry out measurements of the interfaces of an optical element, to deduce therefrom for example measurements of distance or position of these interfaces, and/or measurements of thicknesses of the optical components or of the gaps separating them. These interfaces can for example comprise surfaces of lenses.

These measurements may be carried out with a measurement beam of a distance sensor operating by retro-reflection. To this end, it is necessary for the measurement beam to be incident perpendicularly on the interfaces to be measured (within the limits of an angular tolerance depending on the optics used). Generally, this condition requires the measurement beam to be aligned optimally or at least sufficiently with the optical axis of the optical element to be measured. In practice, this positioning is a tricky and time-consuming operation.

According to the invention, this positioning is determined for one or more optical elements, called reference optical elements, of a plurality of similar optical elements, for example originating from one and the same batch, one and the same production series, or having undergone the same manufacturing steps. The thus-determined measurement point corresponds to a reference point in the field of view of the imaging means.

The method according to the invention makes use of the fact that optical elements having been manufactured according to identical or similar manufacturing steps display similar specific patterns or characteristics of reflected and/or transmitted luminous intensity when they are similarly illuminated. It is thus possible to exploit images, produced by an illumination beam reflected, transmitted and/or scattered by the optical elements and containing such specific patterns or characteristics, so as to determine the relative displacements or shifts of these optical elements in the field of view of the imaging means.

It should be noted that, to the extent that the optical elements comprise or are constituted by transparent components, the images obtained are generally not images of these elements or the surfaces thereof, but optical signatures resulting from the interaction of the illumination with these components.

The displacement information thus obtained may then be used to position the optical elements much more quickly and effectively with respect to the reference point in the field of view. The measurement beam, positioned at the reference or measurement point, is then aligned automatically with the optical axis of the optical element to be measured. The position of the measurement beam corresponds to an optimal position in which the most accurate possible measurements of the interfaces of the optical element can be obtained. By virtue of the positioning of the measurement beam with reference to a characteristic pattern or shape, it is possible to reliably locate the best position of the measurement beam for all the similar optical elements, thus making it possible to obtain reliable, repeatable and reproducible measurements. Knowledge of the positioning of the measurement beam with respect to a characteristic shape is thus used for automated positioning of the optical elements to be measured with respect to one or more reference optical elements and to deduce therefrom, directly and without additional effort, the position of the measurement beam for subsequent measurements of optical elements, after location of at least one of these characteristic patterns.

Determining the measurement point on the reference optical element or elements, and thus the step of relative positioning of the reference optical element or elements and of the measurement beam, can be carried out by known methods. This step does not need to be repeated for the other optical elements to be measured.

The method according to the invention may be implemented, in particular, for controlling optical elements or assemblies during production thereof, for example objectives formed from lenses or microlenses such as smartphone objectives or for the automotive industry, and in particular in mass production. In fact, in this case, it is very important to minimize the measurement time so as to be able to maintain high production rates. The method according to the invention makes it possible to determine as quickly as possible and as reliably as possible the mean optical axis of the optical element or of the assembly to be measured, corresponding to an optimized alignment of the measurement beam, without the need to scan the element with the measurement beam until satisfactory measurement signals are obtained, and without the need to carry out this optimization for each optical element of a batch from one and the same high-volume production. In particular, the positioning of the measurement beam can be carried out quickly by using information on the measurement of a single optical element of this batch.

The step of relative positioning of the reference optical element and of the measurement beam may comprise an alignment of said measurement beam so as to be perpendicular to at least a portion of the interfaces of the at least one reference optical element.

According to an embodiment that is in no way limitative, the method according to the invention may comprise the acquisition of a plurality of reference images by using a plurality of reference optical elements from the plurality of optical elements.

In this case, a reference image can be generated based on a combination of a plurality of reference images. This combination may be produced for example by utilizing the intensities of the different reference images.

According to an embodiment of the method according to the invention that is in no way limitative, the step of determining a difference of positions may comprise a step of comparing the reference and measurement images.

During this comparison step, similarities of shapes and in particular luminous intensity contrast shapes of the images may be exploited for determining the relative position of an optical element with respect to the field of view.

The comparison step may thus comprise the following steps:
- identifying and locating at least one corresponding characteristic shape, respectively in the reference and measurement images;
- determining a difference of position or a relative displacement between said corresponding characteristic shapes, in the reference and measurement images.

Alternatively or in addition, the comparison step may comprise a step of image correlation.

The technique of image correlation is in fact particularly suitable for measuring the differences of position or relative displacements between two images. This is a technique for measuring the displacement field of a portion or of the whole of an image with respect to another image or a reference image.

Generally, the step of determining a difference of position between images can be carried out by implementing any known image registration method.

The difference of position or the relative displacement may be expressed in the form of a geometric transformation, for example a rigid geometric transformation, with translations and rotations.

According to an embodiment that is in no way limitative, the step of adjusting the position may comprise:
- displacement of the optical element to be measured with respect to the field of view; and/or
- displacement of the measurement beam with respect to the field of view.

Adjustment of the position is carried out so as to compensate the difference of position identified in the preceding step. It is carried out at least in translation, which may be sufficient to position the measurement beam. Optionally it may also be carried out in rotation for greater accuracy.

The method according to the invention may also comprise an optimization of the positioning of the measurement beam with respect to the optical element to be measured.

This optimization can be carried out by locally displacing the measurement beam with respect to the element, so as to optimize a measurement parameter, such as a detected intensity or a difference from the expected measurements. The local displacement can be carried out, for example, according to a dot grid or a path, or in such a way as to minimize error gradients.

This optimization is of course similar to the implementation for the relative positioning of a reference optical element and the measurement beam. However, it is still much quicker, as the most time-consuming step for positioning the measurement beam, which is to position it so as to allow a measurement of the interfaces, even if non-optimal, is carried out quickly by virtue of the adjustment of the position of the measurement beam by comparison of the reference and measurement images.

According to an embodiment which is in no way limitative, the steps of the method relating to the optical element to be measured may be carried out for a plurality of optical elements to be measured originating from one and the same production line.

Advantageously, the method according to the invention may be implemented to measure the positions and/or the gaps between the interfaces of an optical element in the form of an optical assembly with lenses, such as a smartphone objective, the interfaces comprising the surfaces of the lenses.

According to another aspect of the invention, a device is proposed for measuring interfaces of an optical element to be measured, forming part of a plurality of similar optical elements comprising at least one reference optical element, the device comprising:
- an imaging channel configured to produce an illumination beam, and comprising imaging means configured to acquire images of an optical element illuminated by said illumination beam in a field of view of the imaging means;
- a measurement channel configured to produce a measurement beam at a determined position with respect to said field of view, and comprising a distance optical sensor configured to produce distance and/or thickness measurements; and
- a processing module configured to process the distance and/or thickness measurements, and the images;

arranged to implement all the steps of the method according to the invention.

The device implementing the method according to the invention represents a measuring system, which means that when the measurement beam is correctly aligned, for example with the optical axis of the optical element to be measured, an exploitable measurement signal is obtained, making it possible to identify interfaces, the positions and gaps thereof.

The device thus allows, for example, in-process control of optical elements to be carried out, so as to verify if they comply with specifications. It should be noted furthermore that if there is no exploitable measurement signal after adjustment of the position, this may mean that it was not possible to align the measurement beam with the optical axis of the optical element to be measured (for example), or that this element has no optical axis common to all the components thereof, indicating that this optical element is defective and must be rejected. This hypothetical case can occur for example if an optical component is not aligned, is off-centre or tilted.

According to an embodiment that is in no way limitative, the optical sensor may comprise a low-coherence interferometer.

Such an interferometer is particularly suitable for carrying out distance and/or gap measurements.

Any type of suitable known low-coherence interferometer can be used. Such an interferometer can implement in particular:
- a low-coherence interferometer technique in the time domain, with a delay line for generating optical delays between interfering waves;
- a low-coherence interferometer technique in the spectral domain, with a spectrometer for analysis of the interference signals; or
- a low-coherence interferometer technique by wavelength scanning, with a tunable laser source.

The device according to the invention may also comprise optical elements for inserting the measurement beam into the imaging channel, so that it is propagated in the field of view.

These optical elements can comprise, for example, beam splitters or beam splitter cubes.

According to a particular embodiment of the device that is in no way limitative, the measurement channel may further be configured to produce a second measurement beam incident on an opposite face of the optical element to be measured.

In this case, the optical element to be measured can be measured on both faces thereof.

Advantageously, the device according to the invention may further comprise a support for receiving the plurality of optical elements.

This support can consist, for example, of a support for samples intended to receive a plurality of optical elements to be measured in receptacles or apertures, these receptacles or apertures capable of being aligned, for example, in a grid pattern.

Preferably, the optical elements to be measured are aligned on the support so as to have the respective optical axes thereof parallel to the optical axis of the imaging means and the measurement beam. In fact, for optical elements with precise tolerances, such as barrels of lenses, this parallelism can be carried out with sufficient accuracy by tolerancing and mechanical adjustment.

In this case, the device according to the invention may comprise displacement means capable of displacing the support in a plane perpendicular to an optical axis of the imaging means.

These displacement means can for example comprise translation and/or rotation tables.

The alignment of the optical elements to be measured is then carried out only in the plane perpendicular to the optical axis of the imaging means, which can easily be obtained at a high rate.

BRIEF DESCRIPTION OF THE DRAWINGS

Other advantages and characteristics of the invention will become apparent on examining the detailed description of examples that are in no way limitative, and from the attached drawings, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures retain the same reference sign.

Figure 1:
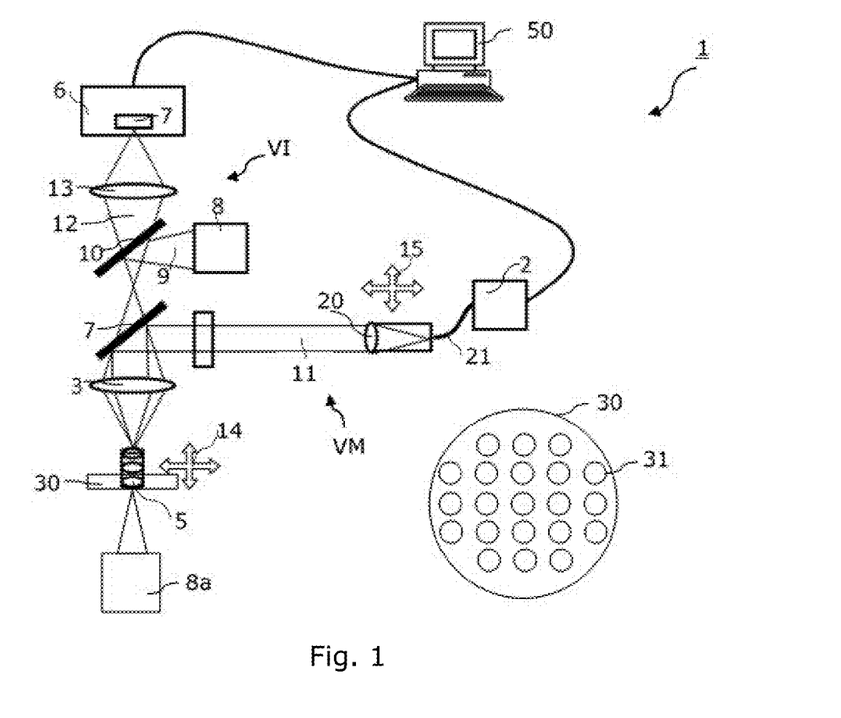
FIG. 1 is a diagrammatic representation of a non-limitative embodiment of a measurement device implemented in the present invention.

FIG. 1 is a diagrammatic representation of a non-limitative embodiment of a measurement device capable of being implemented in the context of the present invention. The device can in particular be used for implementing the method of the invention.

The device 1, shown in FIG. 1, is arranged to carry out measurements of interface positions, or thicknesses, along the optical axis, on an object 5 of the optical element 5 type, such as an optical assembly with a plurality of lenses.

The measurement device 1 comprises an imaging channel VI and a measurement channel VM. In the measurement channel VM, a measurement beam 11 originating from a distance optical sensor 2 is conveyed to a collimator 20, for example by a single-mode optical fibre 21. The collimator 20 forms a substantially collimated beam which is directed towards an object 5 to be measured, by a beam splitter 7, preferably dichroic, or a beam splitter cube. The measurement beam 11 is focussed on the object by a distal objective 3.

The collimator 20 and the distal objective 3 constitute an imaging system that images the core of the fibre 21 from which the measurement beam 11 originates within or in proximity to the object 5.

When the measurement beam 11 is incident on a surface or an interface of the object 5 to be measured in a direction substantially perpendicular to this surface or this interface, within the tolerance limits dependant in particular on the angular aperture at the level of the distal objective 3, the reflections produced on this surface or this interface are re-coupled into the optical fibre 21 and processed in the optical sensor 2.

The distance optical sensor 2 may comprise a low-coherence interferometer.

Figure 2:
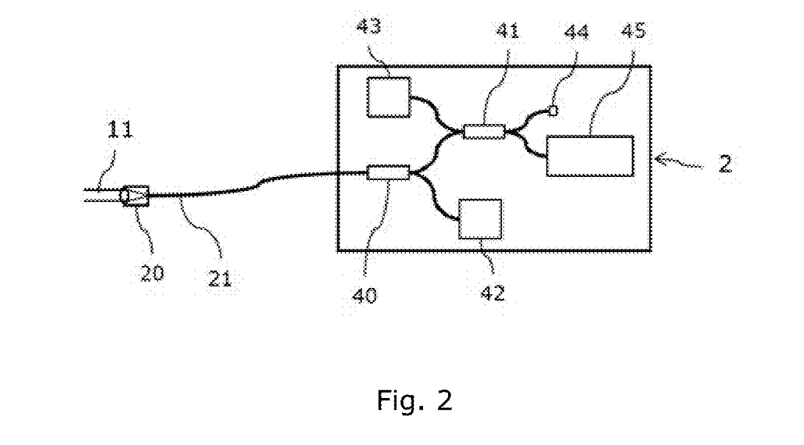
FIG. 2 is a diagrammatic representation of an example optical sensor capable of being utilized in the measurement device of the present invention.

FIG. 2 shows an example low-coherence interferometer in the time domain, usable within the context of the present invention.

The low-coherence interferometer 2 can operate for example in the infrared. For measuring optical assemblies with antireflective treatments, it can be advantageous to choose for the interferometer a working wavelength different to those for which the antireflective treatments are optimized, in which case they may exhibit a high reflectivity. Thus, an interferometer operating in the infrared is very suitable for measuring optical assemblies intended to be used in visible wavelengths.

Furthermore, in the configuration shown in FIG. 1, the interferometer 2 is intended to operate through imaging means, and in particular the distal objective 3, which are optimized for visible wavelengths, standard in microscopy. Now, on the other hand it is known that antireflective treatments of optics optimized for visible wavelengths tend to increase substantially the reflectivity of the surfaces under infrared, sometimes up to 30%, which constitutes very harsh measurement conditions for infrared interferometry. The method implemented in the interferometer 2 specifically allows it to be rendered practically insensitive to the parasitic reflections.

This result is achieved by implementing a low-coherence interferometer principle in which only the reflections of the measurement beam 11 having occurred in a measurement zone or extent encompassing the interfaces of the object 5 (or at least at an optical distance equivalent to the optical distance between the collimator 20 and the object 5 along the beam 1) can cause usable interferences.

The interferometer 2, as shown in FIG. 2, comprises a double Michelson interferometer based on single-mode optical fibres. It is illuminated by a fibre light source 42. The light source 42 can be a Super Luminescent Diode (SLD) the central wavelength of which can be of the order of 1300 nm to 1350 nm. The choice of this wavelength corresponds in particular to criteria of availability of the components.

The light originating from the source 42 is directed through a coupler 40 and the fibre 21 to the collimator 20, to constitute the measurement beam 11. A portion of the beam is reflected in the fibre 21 at the level of the collimator 20, for example the silica-air or glass-air interface constituting the end of the optical fibre, in order to constitute the reference wave.

The retro-reflections originating from the object 5 are coupled in the fibre 21 and directed with the reference wave to a decoding interferometer constructed around a fibre optic coupler 41. This decoding interferometer has an optical correlator function, the two arms of which are respectively, a fixed reference 44 and a time-delay line 45. The signals reflected at the level of the reference 44 and the delay line 45 are combined, through the coupler 41, on a detector 43. The function of the delay line 45 is to introduce an optical delay between the incident and reflected waves, variable over time in a known manner, obtained for example by the displacement of a mirror.

The length of the arms 44 and 45 of the decoding interferometer is adjusted so as to make it possible to reproduce with the delay line 45 the differences in optical paths between the reference wave reflected at the level of the collimator 20 and the retro-reflections originating from the object 5, in which case an interference peak is obtained at the level of the detector 43, the shape and width of which depend on the spectral characteristics of the source 42.

Thus, the extent of the measurement is determined by the difference in optical length between the arms 44 and 45 of the decoding interferometer 2, and by the maximum stroke of the delay line 45. Moreover, as the reference wave is generated at the level of the collimator 20 outside of the imaging system, the parasitic reflections in the measurement channel VM do not significantly contribute to the interferences.

With reference to FIG. 1, the imaging channel VI of the device 1 according to the embodiment shown comprises a camera 6, equipped with a CCD7 matrix sensor, as well as imaging optical means suitable for forming an image of the object 5, or at least of the input face thereof, on the sensor 7 of the camera 6, according to a field of view on the object 5, the field of view being substantially proportional to the magnification of the imaging optical means and the dimension of the sensor 7.

In the example implementation in FIG. 1, the imaging optical means comprise a distal objective 3 arranged on the side of the object 5 and an optical relay 13.

The imaging channel VI of the device 1 also comprises a light source 8 the emission spectrum of which comprises visible and/or near infrared (around 1 μm) wavelengths. This light source 8 emits an illumination beam 9 which illuminates the object 5 so as to allow imaging thereof by reflection. For reasons of clarity, the illumination beam 9 is not shown in FIG. 1 after the splitter 10 which makes it possible to direct the light from the light source 8 towards the object 5 and the reflected light towards the camera 6.

The device 1 can also comprise, in addition or as a replacement for the light source 8, a light source 8a for lighting the object 5 in transmission.

The interferometric measurement channel VM comprising the measurement beam 11 is arranged so as to pass at least partially through the imaging optical means and in particular the distal objective 3. The measurement beam 11 is inserted into the imaging optical means by the coupling means 7 so that it is incident on the object 5 along a measurement zone comprised within the field of view of the imaging channel.

In another configuration, not shown, the measurement beam can be inserted into the field of view of the imaging means by a beam splitter positioned between the objective 3 and the object 5.

The assembly in FIG. 1 thus makes it possible to insert an interferometric measurement beam 11 into the field of view of an imaging system, consisting of the camera 6, the distal objective 3 and the relay lens 13 in the example shown. By virtue of this configuration, the position of the measurement beam 11 can be known or indexed, or at least fixed, with respect to the images produced by the imaging system.

The collimator 20 can also optionally comprise displacement means 15 which make it possible to displace in a known manner the position of the measurement beam 11 and thus the position of the measurement point on the object 5 with respect to the field of view covered by the imaging means.

In the device 1 as shown in FIG. 1, the interferometric measurement beam 11 is held fixed, in the same position, in the imaging channel VI. Thus, the position of the measurement beam 11 is also held fixed within the frame of reference of the camera. It can also be adjusted and/or determined accurately during a preliminary step of alignment of the device.

In a configuration different from that shown in FIG. 1, the device can comprise means for conveying a second measurement beam onto the object 5 to be inspected, from an opposite side with respect to the object from that of the elements of the imaging channel. In this configuration, it is also possible to index or at least to hold fixed the position of the second measurement beam with respect to the images produced by the imaging means.

In this case, the device can also comprise the measurement beam 11, which makes it possible to measure the object 5 on both faces thereof.

The second measurement beam may originate from the sensor 2, or from another sensor implementing an identical or different measurement principle.

The device 1 according to the embodiment shown in FIG. 1 also comprises a sample support 30 intended to receive the objects to be measured 5, as well as displacement means 14, such as translation and/or rotation tables, making it possible to displace the support 30 within a plane perpendicular to the optical axis of the imaging means.

According to an example also shown in FIG. 1, in particular for the control of objects 5 in the form of optical elements 5 of the camera objectives type produced in volume, the sample support 30 comprises a plurality of receptacles 31 making it possible to receive a plurality of objects 5 to be measured.

By way of example, these objects 5 can be lenses assembled in a barrel, and the receptacles are through openings having a diameter corresponding to that of the barrels, with a shoulder at the base on which the barrel rests.

Preferably, the sample support 30 is arranged so that the objects 5 to be measured are positioned with the respective optical axes thereof parallel to the optical axis of the imaging system and most importantly parallel to the optical axis of the measurement beam 11. Thus, the alignment of the measurement beam 11 on the optical axis of the objects 5 can be carried out with the displacement means in the plane 14 only, and thus at a high rate.

The device 1 according to the invention also comprises a processing module 50, or computing module, configured to process the distance and/or thickness measurements, and the images. This computing module comprises at least one computer, a central processing or calculation unit, a microprocessor (preferably dedicated) and/or suitable software means.

The device 1, according to the embodiment shown in FIG. 1, can be used to implement the steps of the method according to the invention which will be described hereinafter.

Figure 3:
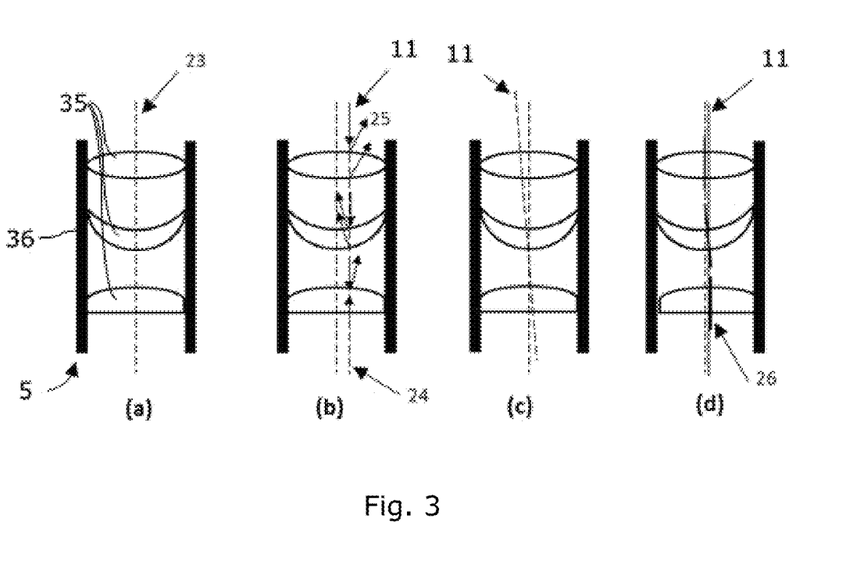
FIG. 3 diagrammatically represents examples of objects or optical elements to be measured, capable of being utilized in the present invention.

FIG. 3 shows examples of objects or optical elements to be measured 5. These are objectives each constituted by several lenses or microlenses 35 mounted in a barrel 36 and stacked along a common optical axis 23.

FIG. 3 (a) shows the ideal case, in which the lenses 35 are perfectly aligned and each of the optical axes of the lenses 35 is superposed on the common optical axis 23 of the thus-formed objective.

FIG. 3 (b) and FIG. 3 (c) show the same object 5 set out in FIG. 3 (a). A position of the measurement beam 11 of the interferometer along a measurement axis is indicated. In the two cases presented, the optical axis 23 of the object 5 and the measurement axis represented by the measurement beam 11 are different, the position of the measurement beam 11 not being optimum. FIG. 3b and FIG. 3c show the two types of alignment errors of the measurement beam 11 with the optical axis 23 to be taken into account, namely, respectively, a centring error and an angular alignment error of the measurement beam 11. In both cases, this results in measurements that are not optimized, or even impossible.

As shown in FIG. 3 (b), reflections 25 of the measurement beam 11 are generated at each interface of the object 5. As a result of the alignment error of the optical axis 23 of the object 5 with respect to the measurement beam 11, the direction of propagation of the reflections 25 at the interfaces is no longer aligned with the direction 24 of the measurement beam 11. This leads to a loss of intensity of the retro-reflected signal during coupling with the optical fibre 21 of the measurement channel of the device 1. It is possible then that interfaces are not detected or are measured with significant errors.

In the examples presented in FIG. 3 (a) to (c), the optical elements (lenses 35) are perfectly aligned and arranged with respect to one another. Errors of individual positions of the lenses 35 created during assembly would be apparent through the same problems of detection of the reflections of the interfaces. In this situation, a single optical axis of symmetry does not exist.

FIG. 3 (d) shows an assembly of lenses 35 each having an optical axis 26 slightly different from a common axis of symmetry 23. The measurement is then only optimized when the measurement beam 11 is aligned on an axis corresponding to a minimum (off-centre and/or angular) positioning error for each lens 35 with respect to the respective optical axes 26 of these lenses 35.

Figure 4:
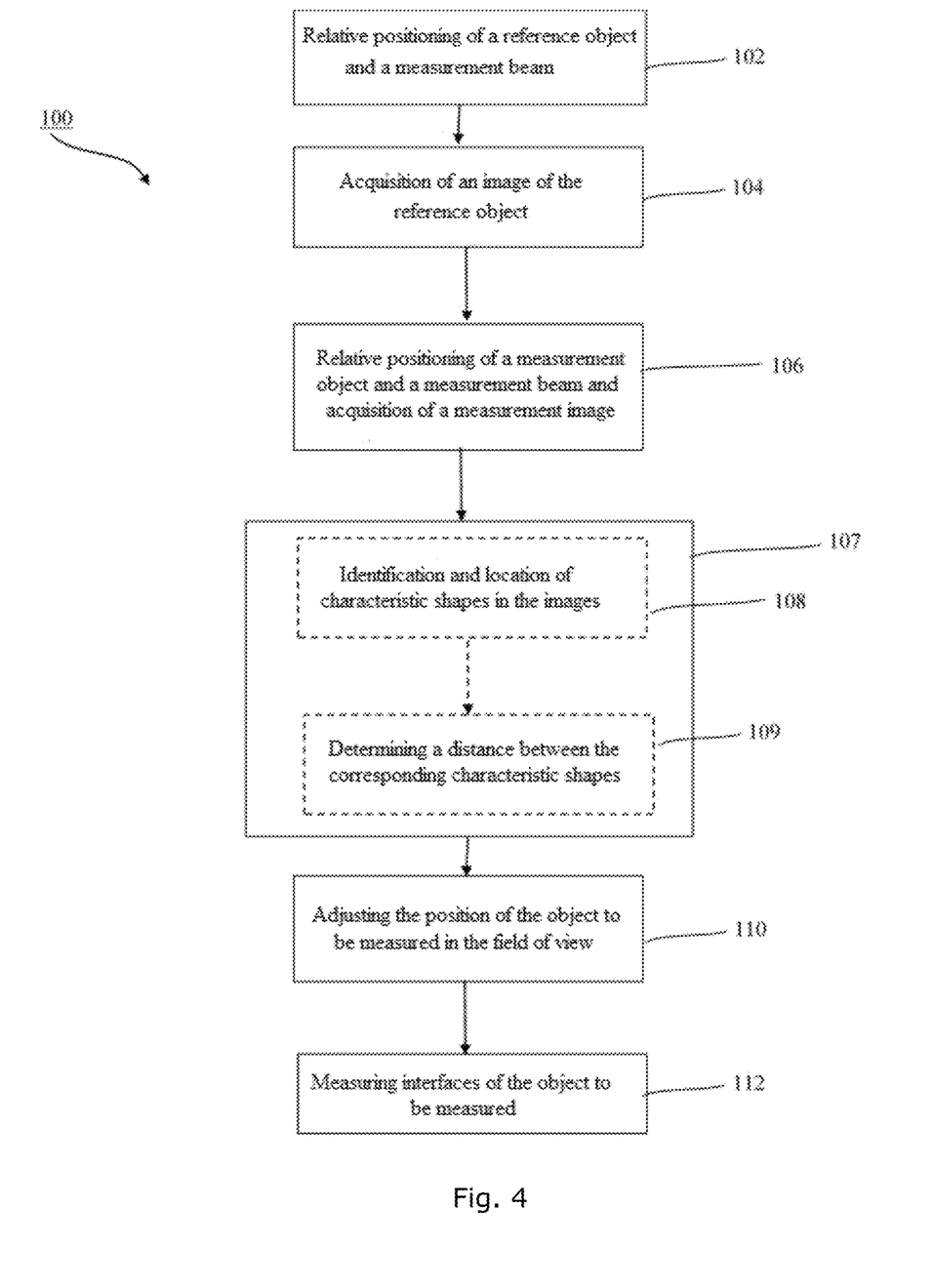
FIG. 4 is a diagrammatic representation of a non-limitative embodiment of a measurement method according to the present invention.

FIG. 4 is a diagrammatic representation of a non-limitative embodiment of a measurement method according to the invention.

The method 100, shown in FIG. 4, comprises a relative positioning step 102 of a reference object and a measurement beam of a distance optical sensor, so as to allow a measurement of the interfaces of the reference object. The measurement beam can originate, for example, from a low-coherence interferometer, such as described with reference to the device 1 in FIG. 1. The reference object and the object to be measured each form part of a plurality of similar objects.

The step 102 makes it possible to determine a measurement point representative of the optical axis of the reference object, and thus to align the measurement beam with the optical axis of the reference object. The measurement beam is positioned at an optimized position for measurement of the interfaces of the reference object.

This optimized measurement position, or reference position, corresponds to the closest alignment of the measurement beam with respect to the mean optical axis of the reference object. In this configuration, a measurement can be obtained of the positions of the surfaces of the elements forming the object that is as accurate as possible.

According to an example, during the positioning step 102, the measurement beam is aligned so as to be perpendicular to at least a portion of the interfaces of the reference object.

The step 102 of determination of an optimized measurement position for the reference object can be carried out according to several approaches.

It is for example possible to carry out a systematic scanning of the reference object by the measurement beam, according to a predetermined path (for example in a grid or a spiral) so as to determine the optimum position according to a criterion such as amplitudes of measurement signals and/or a correspondence of the measurements with expected values.

Of course, the camera can be used to carry out prepositioning and to limit the scanning zone.

When this positioning step 102 is implemented with a device 1 comprising a sample support 30 as described above, the measurement beam 11 can be considered as parallel to the respective optical axes of the objects or of the optical elements 5. For determining the measurement position, displacements are then simply made in the plane of the sample support 30 with the displacement means 14 thereof, such as translation and/or rotation tables.

Figure 5:
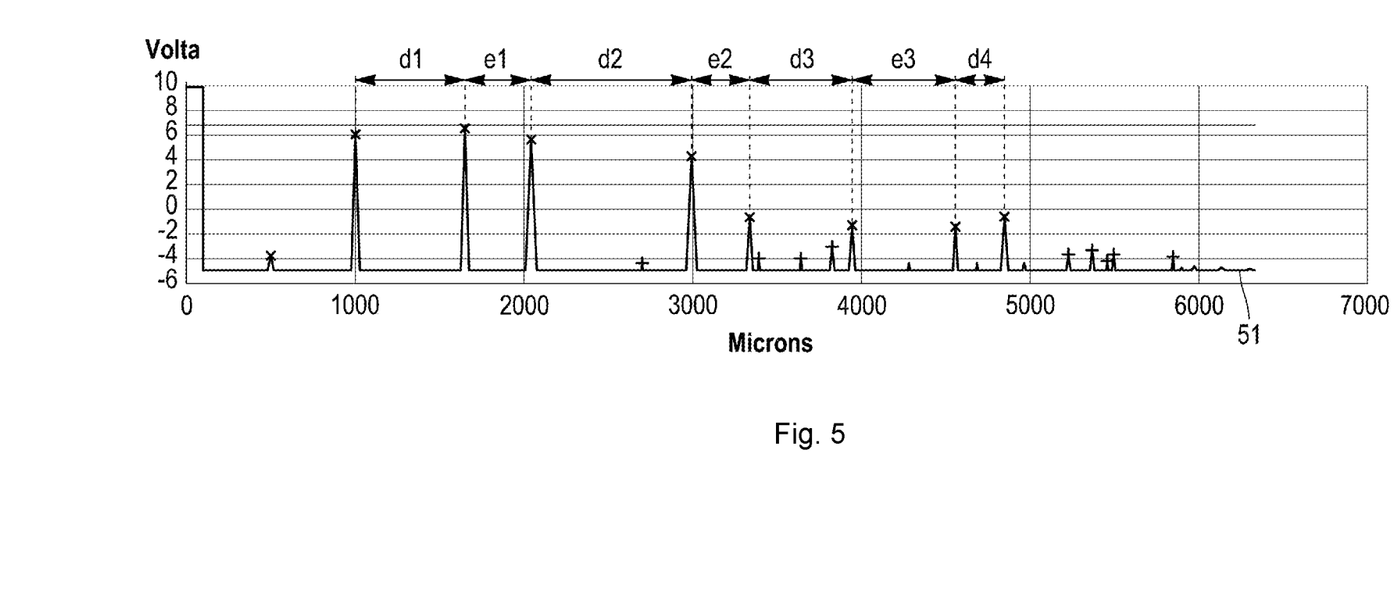
FIG. 5 is an example measurement of a reference object obtained with the present invention.

FIG. 5 shows an example of interferometric measurement obtained with a low-coherence interferometer 2 such as shown in FIG. 2, for an optical element 5 of the camera objective type, formed by a stack of four microlenses along one and the same optical axis. These microlenses have respective thicknesses d1, d2, d3 and d4 and are separated by gaps e1, e2 and e3. The expected values for positions of the surfaces of the microlenses, or of the distances between interfaces, can be known by design or deduced by preliminary measurements. The continuous curve 51 shows a measurement signal 51 with corresponding interferogram envelope peaks representative of reflections of the measurement beam on interfaces of the lenses of the optical element 5. These peaks can correspond to actual interfaces, or be due to multiple reflections in the system (virtual interfaces). To identify the actual interfaces, in particular for complex samples, it is possible to use a priori knowledge on the optical element 5, such as the expected values for positions of surfaces. In the example in FIG. 5, the expected respective positions of the surfaces of the microlenses, as identified on the measurement signal 51, are indicated by crosses. Identification of the expected interfaces on the measurement signal and comparison of the values for positions and/or distances measured with expected values makes it possible to validate the measurement and the position of the measurement beam relative to the optical axis of the reference objective. In fact, if the measurement beam is incorrectly positioned with respect to the optical axis, there are generally no peaks detected on the measurement signal 51, or a portion only, and with potentially inaccurate values for positions or distances. Furthermore, in particular for a measurement optical element 5, the absence of certain peaks or values for positions or distances outside a margin of tolerance with respect to the expected values indicates a faulty optical element, for example with incorrectly positioned lenses.

In the example shown, FIG. 5 gives an experimental measurement result validated on interfaces of a reference camera objective, the peaks of the continuous curve 51 having positions corresponding to the expected positions of the surfaces of the microlenses. This result is therefore representative of the alignment of the measurement beam with the optical axis of the reference camera objective.

During a step 104 of the method 100, an image is acquired, called "reference image" of the object or of the reference optical element, as positioned during the preceding step 102. This acquisition is carried out by virtue of the imaging channel VI, or imaging system, of the device 1 according to the invention.

As described above with reference to FIG. 1, the object 5 is illuminated by an illumination beam 9. In the example shown, this beam is partially reflected by the object along an imaging beam 12 which is imaged on the photodetector 7 of the camera 6.

The reflection images can be produced by the light reflected by the first surfaces of the object or of the element 5, for example the surface of the first optical component and/or of the elements of the barrel.

The images can also result from multiple reflections arising from the different optical components of the object illuminated by the illumination beam 9.

Thus images are generated having luminous intensity contrast shapes characteristic of the object inspected and of the imaging conditions.

Figure 6A:
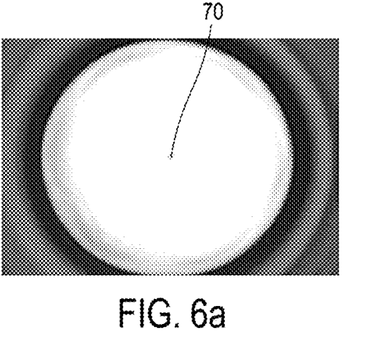
FIG. 6a is an example image of an object obtained with the present invention.

FIG. 6a shows an example image after acquisition and treatment on a computer 50 of the multiple reflections reflected by the microlenses of a camera objective under illumination. In this example, the luminous intensity contrasts have characteristic shapes of substantially concentric rings.

It should be noted that with an object 5 of the optical element or assembly type, strictly speaking it is not an image of the object that is obtained, since the surfaces of the elements of the assembly are reflective and/or transparent. The image obtained corresponds instead to a visual signature due to the contributions of reflected and scattered portions of the illumination beam 9, for example between the lenses and on the walls of the assembly. This involves an image of parasitic reflections in the optical element. In particular, this image generally does not allow the optical axis of the assembly to be visualized.

From this point of view, it can be advantageous to utilize a reflection light source 8 the spectrum of which comprises wavelengths other than those for which the optical element 5 was optimized, in particular at the level of the antireflection treatments, so as to generate more parasitic reflections.

The position 70 of the measurement beam is also labelled on FIG. 6a. It should be noted however that it is not necessary to know this position accurately, since it remains fixed in the field of view of the camera 6.

The collected image of the reference object is saved in data storage means of the device 1, for example in the computer 50.

During a step 106 of the method, an object to be measured is positioned with respect to the field of view of the camera 6 so as to allow the acquisition of an image, called "measurement image", of the object.

As described with reference to FIG. 1, a plurality of objects 5 of a manufacturing batch can be placed on a support 30 arranged so that the objects 5 to be measured are positioned with the respective optical axes thereof parallel to the optical axis of the imaging system of the device 1, and parallel to the optical axis of the measurement beam 11.

The displacement means 14 make it possible to displace the objects 5 with respect to the field of view of the imaging means and with respect to the measurement beam 11 which is fixed in this field of view. The displacement means 14 thus make it possible to change the object to be measured 5 without having to modify the illumination means or the detection system and the position of the measurement beam 11. However, due to the uncertainties of positioning of the objects 5 on the support 30, these displacement means do not make it possible, generally or at least reliably, to directly position the measurement beam 11 in the correct position on an object 5.

To the extent that the reference and to be measured objects 5 are identical or similar, the respective measurement images of the objects 5 obtained with the same measurement device 1 are similar in the sense that the contrast patterns or textures present in the images are similar. The measurement images are therefore also similar to the reference image saved beforehand.

Once a measurement image has been acquired for an object, it is compared to the reference image in a step 107 of the method. This comparison step 107 makes it possible to exploit similarities of shapes or contrast to determine a difference of positions in the field of view of the object to be measured with respect to the reference object.

During the step 107, the measurement and reference images are analyzed to deduce therefrom an item of position difference information of the object to be measured with respect to the reference object in the field of view of the imaging system. The difference of position information makes it possible to deduce the relative position of the object to be measured with respect to the measurement beam 11, the position of which is held fixed in the field of view.

According to an example implementation of the step 107, similar shapes or contours are sought in measurement and reference images, it being possible for these contours and shapes to appear in different positions.

More specifically, during a step 108, each image is analyzed in order to identify and locate one or more characteristic shapes. The identification of the characteristic shapes in the acquired images can be carried out with any known image processing techniques, for example by shape recognition and/or image correlation.

The characteristic shapes can comprise, for example, an image, or portion of an image in greyscale or in colour, or a contour image obtained by a contour extraction and/or segmentation technique. The shapes can originate from calibration measurements and/or a theoretical or geometric modelling. They can take the shape of a unique, global image or structure, or a set of distinct images or structures with known spatial relationships.

The characteristic shapes can be predetermined in certain cases.

The differences of position of the characteristic shapes correspond to the respective positions of the object to be measured and the reference object in the field of view.

During a step 109, the distances between the contours or characteristic shapes of two respective images can then be calculated to provide the difference of positions, in the same field of view, between the two images.

Figure 6B:
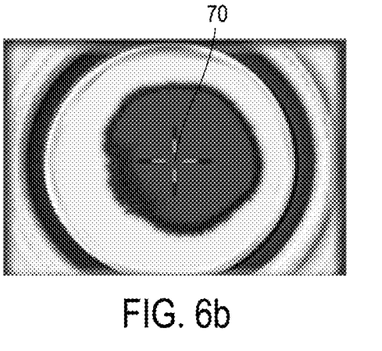
FIG. 6b is an example processed image of an object obtained with the present invention.

FIG. 6*b* shows an example of processing of the image in FIG. 6*a*. The treatment applied is a filtering of the gradient type, which highlights variations in greyscale of the image in FIG. 6*a*. Thus characteristic shapes become apparent that are easier to locate on scattering or parasitic reflection images in transparent optical elements.

Figure 7A:
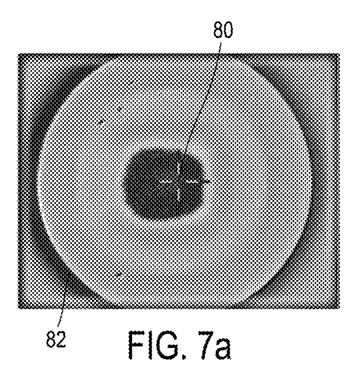
FIG. 7a is an example processed image of a reference object obtained with the present invention.
Figure 7B:
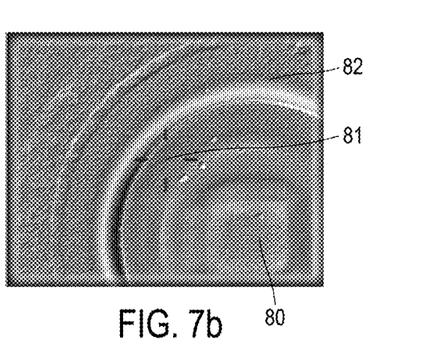
FIG. 7b is an example processed image of an object to be measured obtained with the present invention.
Figure 8A:
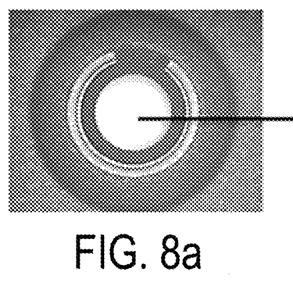
FIG. 8 shows a non-limitative example of implementation of steps of the method according to the present invention.
Figure 8B:
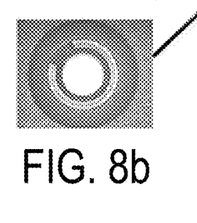
Figure 8C:
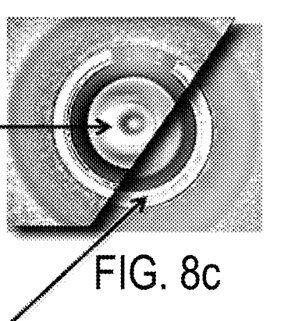
Figure 8D:
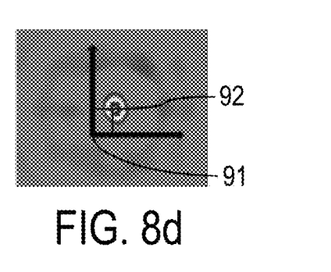

FIGS. 7*a* and 7*b* show examples of processed images of a reference object and an object to be measured, respectively. The treatment causes characteristic shapes 82 to appear. A cursor 80 indicates the position of the measurement beam in the field of view of the camera. In FIG. 7*a*, corresponding to a reference image, this position of the measurement beam is aligned with the optical axis of the reference object.

In FIG. 7*b*, the object to be measured appears in a different position in the field of view of the imaging system with respect to the position of the reference object in FIG. 7*a*. A second cursor 81 indicates the position of the optical axis of this object to be measured, on which the measurement beam must be placed, and which is unknown. The difference in the position of the cursors 80, 81 thus corresponds to the shift of the object to be measured with respect to the reference object in the field of view, and consequently with respect to the measurement beam of the distance optical sensor. According to the invention, this shift is determined by an image registration technique, the aim of which is to best superpose, in the field of view, the two images and/or the characteristic shapes 82 thereof so as to determine the difference of position thereof.

According to a preferential example of implementation of the step 107 of the method of the invention, an image correlation method is used to determine the difference of positions of the object to be measured with respect to the reference object in the field of view. It is assumed that any difference between the reference image and the deformed or displaced image of the object to be measured arises only from the effect of the displacement field of the characteristic shape observed.

FIG. 8 shows an example implementation of step 107 of the method based on the utilization of image correlation.

FIG. 8 (*a*) and 8 (*b*) respectively show a saved reference image of a reference object and a measurement image of a measured object. FIG. 8 (*c*) shows a superposition of the images in FIG. 8 (*a*) and (*b*), utilized for the correlation calculation, for a particular relative position (x, y). A plurality of superpositions of images for different relative positions (x, y) are utilized for carrying out this calculation.

FIG. 8 (*d*) shows a graph of correlation of the images in FIG. 8 (*a*) and (*b*), as a function of the plurality of relative positions (x, y) of these images. The origin position 91 corresponds to the position of the reference image. The maximum of the graph corresponds to the position 92 of the maximum correlation for the measurement image. Comparison of the two positions 91, 92 makes it possible to obtain the registration values between the two images in the same field of view and therefore, at the same time, the position adjustments to be carried out between the measurement and reference objects.

It should be noted that in the example shown, these registration or adjustment values are determined in translation only. In fact, to the extent that the optical objects or elements considered essentially have a rotational symmetry with respect to the optical axis thereof, the rotational difference of position between the reference object and the measurement object can be disregarded.

When the difference of positions in the field of view of the object to be measured with respect to the reference object has been determined, the following step 110 of the method according to the invention, shown in FIG. 4, consists of an adjustment of the position of the object to be measured in the field of view with respect to the position of the reference object, so as to cancel the difference of positions.

In fact, as shown above, the difference of positions in the field of view of the imaging system between the images of the reference object and the measured object makes it possible to directly deduce the difference in the positions of the objects in this same field of view.

This knowledge allows the object to be measured to be displaced in the field of view to place it in a position corresponding to the position of the reference object. During this step 110, the optical axis of the object to be measured is thus automatically aligned with the measurement beam 11 of the distance optical sensor 2. This is due to the fact that the measurement point determined in step 102 of the method and representative of the optical axis of the reference object is located on the object to be measured.

In the embodiment presented, the step 110 of adjustment of the position is carried out on the one hand by displacing the object to be measured with respect to the field of view by using the displacement means 14.

Of course, on the other hand this position adjustment can be carried out by displacing the measurement beam with respect to the field of view by using the displacement means 15.

At the end of this registration step 110, the object to be measured is therefore correctly positioned in the field of view, so that the measurement beam is aligned with the optical axis of the object to be measured.

During a measurement step 112, interfaces of the object to be measured are measured by means of the measurement beam 11.

Figure 9:
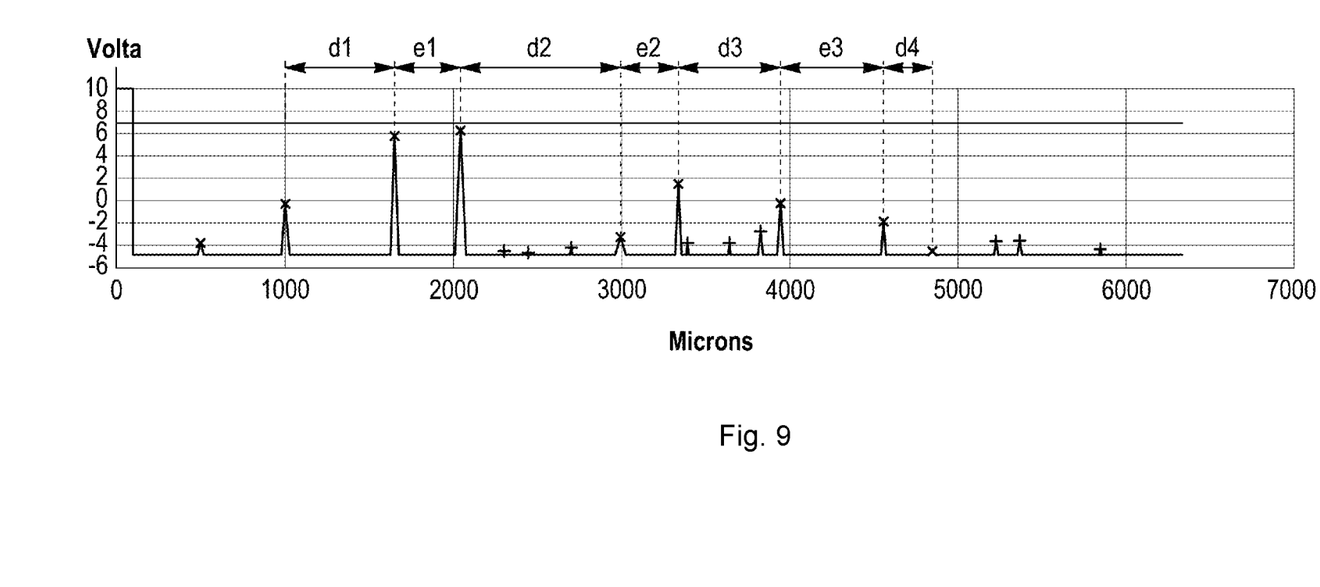
FIG. 9 is an example measurement of an object to be measured obtained with the present invention.

FIG. 9 shows an example of a low-coherence interferometer measurement result for a camera objective originating from the same manufacturing batch as the reference objective, the measurement results of which are shown in FIG. 5, set out above with respect to step 104 of determining the representative measurement point of the optical axis.

In FIG. 9, a measured intensity is traced as a function of a distance travelled by the measurement beam. The intensity peaks corresponding to the expected positions, marked by crosses, of the surfaces of the microlenses are correctly detected.

Of course, the invention is not limited to the examples that have just been described, and numerous modifications may be made to these examples without exceeding the scope of the invention.

The invention claimed is:

1. A method for measuring interfaces of an optical element to be measured, forming part of a plurality of similar optical elements comprising at least one reference optical element, the method being implemented by a measurement device comprising:

an imaging channel configured to produce an illumination beam, and comprising imaging means configured to acquire images of an optical element illuminated by said illumination beam in a field of view of the imaging means; and a measurement channel configured to produce a measurement beam at a determined position with respect to said field of view, and comprising a distance optical sensor configured to produce distance and/or thickness measurements;

said method comprises the following steps:

relative positioning of the at least one reference optical element and the measurement beam, so as to allow a measurement of interfaces of said at least one reference optical element;

acquisition of a reference image, of the thus-positioned at least one reference optical element;

positioning of the optical element to be measured with respect to the field of view so as to allow the acquisition of a measurement image, of said optical element to be measured;

determining a difference of position in the field of view of the optical element to be measured with respect to the at least one reference optical element, based on the reference and measurement images;

adjusting the position of the optical element to be measured in the field of view so as to cancel said difference of position; and measuring the interfaces of the optical element to be measured, by means of the measurement beam.

2. The method according to claim 1, characterized in that the step of relative positioning of the at least one reference optical element and of the measurement beam comprises an alignment of said measurement beam so as to be perpendicular to at least a portion of the interfaces of the at least one reference optical element.

3. The method according to claim 1, characterized in that it comprises the acquisition of a plurality of reference images by using a plurality of reference optical elements of the plurality of optical elements.

4. The method according to claim 1, characterized in that the step of determining a difference of positions comprises a step of comparison of the reference and measurement images.

5. The method according to claim 4, characterized in that the comparison step comprises the following steps:

identifying and locating at least one corresponding characteristic shape, respectively in the reference and measurement images;

determining a difference of position between said corresponding characteristic shapes, in the reference and measurement images.

6. The method according to claim 4, characterized in that the comparison step comprises an image correlation step.

7. The method according to claim 1, characterized in that the step of adjusting the position comprises:

displacement of the optical element to be measured with respect to the field of view; and/or displacement of the measurement beam with respect to the field of view.

8. The method according to claim 1, characterized in that the steps relating to the optical element to be measured are carried out for a plurality of optical elements to be measured originating from one and the same production ensemble.

9. The method according to claim 1, characterized in that it is implemented to measure the positions and/or the gaps between the interfaces of an optical element to be measured in the form of an optical assembly with lenses, such as a smartphone objective, the interfaces comprising the surfaces of the lenses.

10. A device for measuring interfaces of an optical element to be measured, forming part of a plurality of similar optical elements comprising at least one reference optical element, the device comprising:

an imaging channel (VI) configured to produce an illumination beam, and comprising imaging means configured to acquire images of an optical element illuminated by said illumination beam in a field of view of the imaging means;

a measurement channel (VM) configured to produce a measurement beam at a determined position with respect to said field of view, and comprising a distance optical sensor configured to produce distance and/or thickness measurements; and a processing module configured to process the distance and/or thickness measurements, and the images;

arranged to implement all the steps of the method according to claim 1.

11. The device according to claim 10, characterized in that the optical sensor comprises a low-coherence interferometer.

12. The device according to claim 10, characterized in that it comprises optical elements for inserting the measurement beam into the imaging channel (VI), so that it is propagated in the field of view.

13. The device according to claim 10, characterized in that the measurement channel (VM) is further configured to produce a second measurement beam incident on an opposite face of the optical element to be measured.

14. The device according to claim 10, characterized in that it further comprises a support for receiving the plurality of optical elements.

15. The device according to claim 14, characterized in that it further comprises displacement means suitable for displacing the support in a plane perpendicular to an optical axis of the imaging means.

* * * * *